(12) United States Patent
Mak

(10) Patent No.: US 8,845,788 B2
(45) Date of Patent: Sep. 30, 2014

(54) METHODS AND CONFIGURATIONS FOR H2S CONCENTRATION IN ACID GAS REMOVAL

(75) Inventor: John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 0 days.

(21) Appl. No.: 13/569,069

(22) Filed: Aug. 7, 2012

(65) Prior Publication Data

US 2013/0036911 A1    Feb. 14, 2013

Related U.S. Application Data

(60) Provisional application No. 61/521,216, filed on Aug. 8, 2011.

(51) Int. Cl.
| | | |
|---|---|---|
| *B01D 53/14* | (2006.01) | |
| *C10K 1/08* | (2006.01) | |
| *C10K 3/04* | (2006.01) | |

(52) U.S. Cl.
CPC ............. *C10K 1/08* (2013.01); *B01D 2257/504* (2013.01); *B01D 2252/20489* (2013.01); *B01D 2256/22* (2013.01); *C10K 3/04* (2013.01); *B01D 2256/00* (2013.01); *B01D 53/1425* (2013.01); *B01D 2257/304* (2013.01); *B01D 53/1462* (2013.01)
USPC .................... 95/173; 95/174; 95/176; 95/192; 95/208; 95/227; 95/228; 95/235; 95/236; 95/204

(58) Field of Classification Search
CPC ........... B01D 2256/00; B01D 2256/22; B01D 2257/304; B01D 2257/504; B01D 53/1425; B01D 53/1462; C10K 1/08; C10K 3/04
USPC ............................... 95/235, 236; 96/243–371
See application file for complete search history.

(56) References Cited

U.S. PATENT DOCUMENTS

| | | | |
|---|---|---|---|
| 3,664,091 A | 5/1972 | Hegwer | |
| 3,824,766 A | 7/1974 | Valentine | |
| 4,552,572 A | 11/1985 | Galstaun | |
| 4,568,364 A | 2/1986 | Galstaun | |
| 5,137,550 A * | 8/1992 | Hegarty et al. | ................. 95/174 |
| 7,635,408 B2 | 12/2009 | Mak | |
| 2005/0172807 A1* | 8/2005 | Mak | ............................... 95/235 |
| 2010/0111784 A1* | 5/2010 | Mak et al. | ..................... 422/190 |

FOREIGN PATENT DOCUMENTS

WO         9912847         3/1999

* cited by examiner

*Primary Examiner* — Duane Smith
*Assistant Examiner* — Cabrena Holecek
(74) *Attorney, Agent, or Firm* — Fish & Tsang, LLP

(57) ABSTRACT

A syngas treatment plant is configured to remove sulfurous compounds from syngas in a configuration having two flash stages for a physical solvent to so enrich the acid gas to at least 40 mol % H2S or higher as required by the Claus unit and to flash and recycle CO2 back to the syngas feed. Contemplated methods and configurations advantageously remove sulfur to less than 10 ppmv while increasing H2S selectivity at high pressure operation to thereby allow production of an H2S stream that is suitable as feed gas to a Claus plant.

14 Claims, 2 Drawing Sheets

METHODS AND CONFIGURATIONS FOR H2S CONCENTRATION IN ACID GAS REMOVAL

This application claims priority to U.S. provisional patent application with the Ser. No. 61/521,216, which was filed Aug. 8, 2011.

FIELD OF THE INVENTION

The field of the invention is H2S selective acid gas removal from high pressure syngas containing H2S and CO2.

BACKGROUND OF THE INVENTION

The chemical composition of gasifier syngas predominantly depends on the particular gasification technology and feedstock characteristics. For example, oxygen blown gasifiers will produce a concentrated syngas with mainly H2 and CO, while air blown gasifiers will produce a nitrogen rich syngas. Where the gasification feedstock is petroleum coke, vacuum residual oil, or tar, the syngas will typically have a relatively high H2S content. On the other hand, where the gasification feedstock is coal, the sulfur content in the syngas may vary considerably as lignite and brown coal will generally produce low sulfur syngas and bituminous coal will typically lead to high sulfur syngas.

Regardless of the particular feedstock, gasification plant syngas will generally contain predominantly H2 next to CO2, CO and H2S. When carbon capture is required, one or more CO shift reactors can be implemented to convert CO to H2 and CO2, thus producing a syngas with a relatively high CO2 content, typically greater than 40 mole %. In most cases, the H2S content in syngas varies from 0.05 to over 0.1 mole % (depending on feedstock). Therefore, the CO2 to H2S molar ratio in the syngas is very high (e.g., greater than 100), which poses a substantial problem for sulfur removal that relies on a downstream Claus unit. For example, even where an acid gas removal unit uses an H2S selective solvent, the solvent will co-absorb substantial quantities of CO2 and therefore in almost all cases fail to produce an H2S rich acid gas that is suitable for use in a Claus unit.

Since the Claus unit is a combustion unit, the acid gas feed to a Claus unit must have an H2S concentration of at least 25 mol % along with sufficient heating values for the sulfur conversion reaction. Even higher H2S concentrations are required where the acid gas also contains ammonia and BTEX (benzene, toluene, and xylenes) components. Thus, for most IGCC power plants that are integrated with a Claus unit, the H2S content in the acid gas must be at least 40 mol % to ensure complete ammonia destruction. If the H2S content in the acid gas is too low, additional processing steps are required, such as supplemental fuel gas firing, preheating acid gas, and combustion air and oxygen enrichment. These additional processing steps are costly and can seldom be justified. Alternatively, the acid gas can be concentrated in certain plant configurations by an enrichment process that can be integrated to the acid gas removal unit. Examples for such enrichment units are shown in U.S. Pat. No. 7,635,408 to Mak et al. Here, several fractionation columns are used and the acid gas product is recycled to raise the acid gas content. While these processes are quite selective at low pressure (e.g., 10 psig) operation, they generally fail to produce an acid gas rich in H2S at high pressures such as those encountered in a gasification plant. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Most typically, syngas is produced at pressures between 400 and 900 psig. Under these conditions, an H2S selective solvent such as DMEPG (dimethyl ethylene polyglycol) provides about 6 to 8 times higher solubility for H2S as compared to CO2. However, such low selectivity is almost always entirely insufficient to produce an acid gas product suitable for a Claus plant, especially where the syngas has a high CO2 to H2S ratio as the solvent circulation required to meet sulfur specifications must be sufficiently high which tends to co-absorb significant amounts of CO2, subsequently diluting the H2S content in the acid gas to the Claus sulfur plant.

Consequently, although many configurations and methods for acid gas removal from syngas are known in the art, all or almost all of them suffer from various disadvantages. Therefore, there is still a need to provide methods and configurations for acid gas removal, especially for treatment of syngas to produce a concentrated acid gas stream suitable as feed for a Claus plant.

SUMMARY OF THE INVENTION

The inventive subject matter is drawn to various plants, configurations, and methods of syngas treatment to produce a treated syngas and an acid gas stream that is suitable as feed for a Claus plant.

In one aspect of the inventive subject matter, a syngas treatment plant for selective removal of H2S from an H2S- and CO2-containing syngas of a syngas source will include an absorber that receives the syngas and a lean solvent, and that produces a treated (typically CO2-containing) syngas and a rich solvent comprising H2S and CO2. A flash vessel is coupled to the absorber, receives the rich solvent, and produces a flash gas that is enriched in CO2 and a flashed rich solvent comprising H2S. In especially preferred plants, the flash gas that is enriched in CO2 is delivered via a conduit to the absorber and/or the H2S- and CO2-containing syngas. A regenerator is then used to receive the flashed liquid and to produce the lean solvent and an H2S rich acid gas stream from the flashed rich solvent. It is further generally preferred that a first heat exchanger heats the rich solvent using heat from the lean solvent.

Where desired, a second heat exchanger may be employed that heats the flashed rich solvent using heat from the lean solvent. Contemplated plants will also typically include a compressor that receives and compresses the flash gas enriched in CO2 up to absorber pressure (typically between 400 psig and 900 psig). It is still further contemplated that the plant may include additional flash stages to increase the H2S to CO2 ratio in the rich solvent.

Therefore, and viewed from a different perspective, a method of treating a (shifted or unshifted) H2S- and CO2-containing syngas will include a step of absorbing in an absorber at syngas pressure H2S and CO2 from the syngas using a lean physical solvent to so form a treated (typically CO2-containing) syngas and a rich solvent comprising H2S and CO2. In another step, the rich solvent is heated and flashed in at least one flash stage to produce a flash gas that is enriched in CO2 and a flashed rich solvent comprising H2S. The flash gas enriched in CO2 is preferably recycled to the syngas or absorber, and the flashed rich solvent comprising H2S is regenerated to so form the lean physical solvent and an H2S rich acid gas stream. Most preferably, the H2S rich acid gas stream will have a composition that is suitable for use in a Claus plant or other sulfur recovery plant.

In particularly preferred aspects, the step of absorbing is performed at a pressure of between 400 psig and 900 psig, and/or the step of heating is performed in a heat exchanger using heat from the lean solvent. Additionally, it should be appreciated that the rich solvent may be further flashed to generate additional flash gas enriched in $CO_2$. As noted above, it is also contemplated that the step of recycling may include a step of compressing the flash gas enriched in $CO_2$.

It is still further generally preferred that the $H_2S$- and $CO_2$-containing syngas has a molar ratio of $CO_2$ to $H_2S$ of at least 10:1, that the treated $CO_2$-containing syngas has an $H_2S$ concentration of equal or less than 10 ppmv, and/or that the treated $CO_2$-containing syngas has a reduced $CO_2$ content relative to that of the $H_2S$- and $CO_2$-containing syngas. Most typically, the $H_2S$ rich acid gas stream has an $H_2S$ content of at least 40 mol %, and/or that contains a higher molar fraction of $H_2S$ relative to $CO_2$. With respect to the flashed rich solvent, it is contemplated that the flashed rich solvent has a $CO_2$ to $H_2S$ molar ratio of equal or less than 1.0 where the $H_2S$- and $CO_2$-containing syngas is a shifted syngas, and that the flashed rich solvent comprising $H_2S$ has a $CO_2$ to $H_2S$ molar ratio of equal or less than 0.6 where the $H_2S$- and $CO_2$-containing syngas is an unshifted syngas. Likewise, it is contemplated that the rich solvent comprising $H_2S$ has a $CO_2$ to $H_2S$ molar ratio of equal or less than 5.0 where the $H_2S$- and $CO_2$-containing syngas is a shifted syngas, and that the rich solvent comprising $H_2S$ has a $CO_2$ to $H_2S$ molar ratio of equal or less than 2.0 where the $H_2S$- and $CO_2$-containing syngas is an unshifted syngas.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
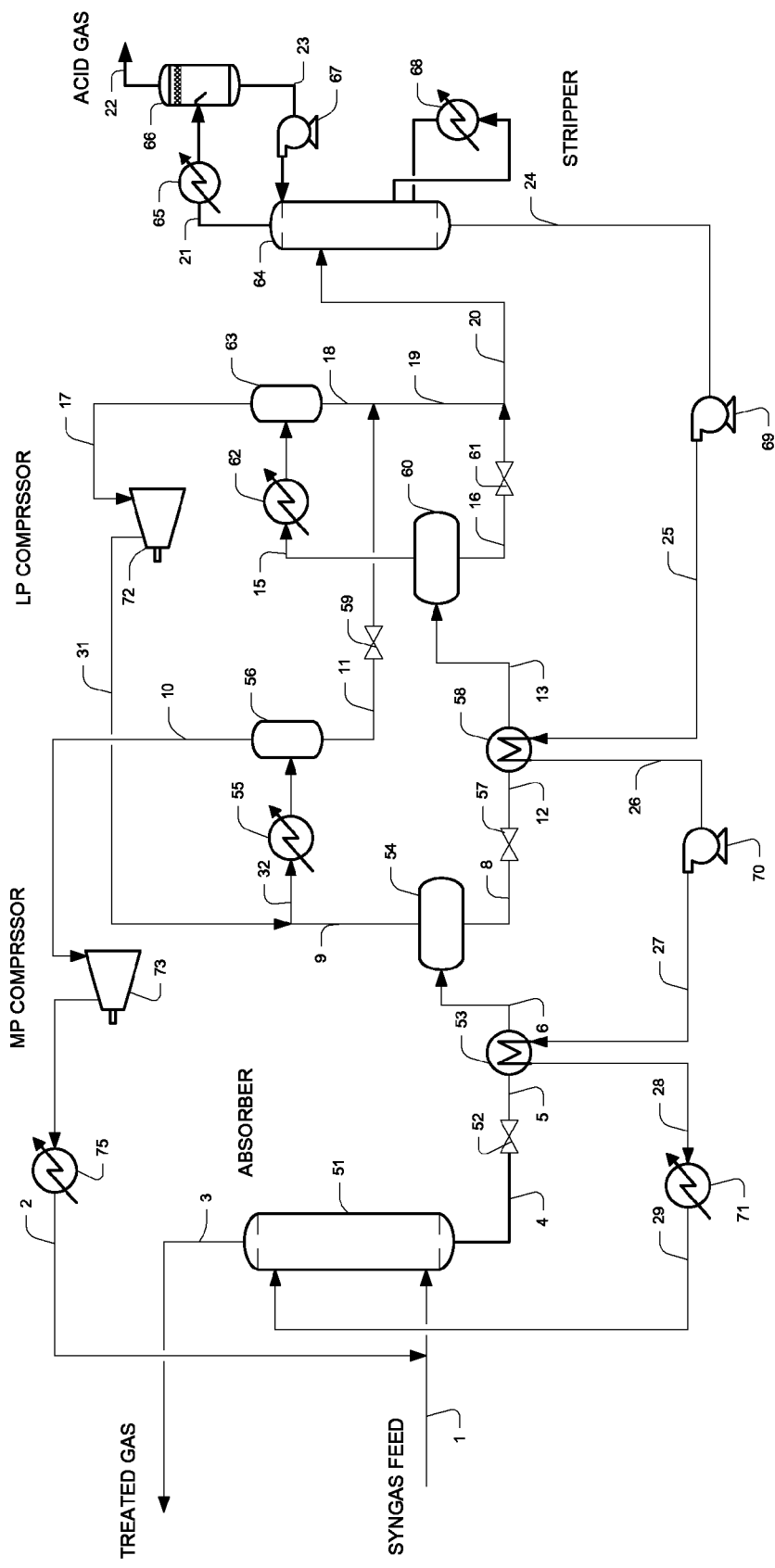
FIG. 1 is a schematic illustration of one exemplary plant configuration according to the inventive subject matter.

The present inventive subject matter is directed to various plant configurations and methods of highly selective $H_2S$ removal from syngas. In especially preferred aspects of the inventive subject matter, an $H_2S$ selective solvent is used to absorb $H_2S$ and co-absorb $CO_2$ from the syngas to form a rich solvent, which is then flashed from the rich solvent, preferably in at least two stages after heating using heat from the $H_2S$ stripper. The so flashed $CO_2$ is then recycled to the untreated syngas and/or absorber, and the $H_2S$ rich stream from the $H_2S$ stripper is fed to a Claus plant. Using methods and configurations contemplated herein, an acid gas with greater than 40 mol % $H_2S$ can be obtained while the treated syngas has a total sulfur content of less than 10 ppmv.

In further particularly preferred aspects, the heat exchangers are designed with close temperature approaches (e.g., 20° F. or lower) to increase flashing of $CO_2$ and minimize the heat requirement in the stripper. Additionally, it is typically preferred that the separator liquids are heat exchanged with the rich solvent, resulting in an increase in the rich solvent temperature and a reduction in cooling duty for the regenerated, lean solvent. In yet another aspect of the invention, the rich solvent from the last flash stage is regenerated, most typically using a stripper with a reboiler and a condenser to produce a lean solvent to the absorber and an acid gas suitable for direct use in a Claus plant. With respect to the stripper it should be appreciated that all known stripping columns/regenerators are deemed suitable for use herein. Among other regenerators, suitable regenerators include steam strippers, regenerator columns with a steam reboiler, strippers using inert stripping gas or treated feed gas as stripping medium, etc. However, especially preferred strippers are regenerators that use steam as stripping medium and/or a steam reboiler to generate steam in the regenerator.

Most preferably, the syngas is at a pressure of between about 250 psig and about 1200 psig, and more typically between about 400 psig and about 900 psig. Thus, the rich solvent leaving the absorber will be a high-pressure (substantially same pressure as the absorber pressure) and is subsequently letdown in pressure and heated to a temperature of about 230° F. to about 280° F., preferably in two stages, producing flash gases with high $CO_2$ content, which is recycled to the untreated syngas and/or absorber, while the $H_2S$ content in the flashed rich solvent is enriched (relative to the $CO_2$ content). The flashed rich solvent is then regenerated in a stripper to produce an acid gas with greater than 40%, preferably greater than 50%, and most preferably greater than 60% $H_2S$, and a lean solvent for $H_2S$ absorption. Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

One exemplary configuration for an acid gas removal unit according to the inventive subject matter is depicted in FIG. 1. Here, syngas gas from gasification unit, stream 1, contains about 19 mole % $CO_2$ and 1.5 mole % $H_2S$ operating at about 800 psig, is mixed with recycle gas stream 2 and fed to absorber 51 where $H_2S$ and $CO_2$ are absorbed by the lean solvent at about 32° F. About 2800 GPM lean solvent is required to treat 330 MMscfd syngas producing treated gas stream 3 with less than 10 ppmv total sulfur and a rich solvent bottom stream 4. The heat of acid gas absorption raises the bottom temperature to about 65° F. As used herein, the term "about" when used in conjunction with numeric values refers to an absolute deviation of less or equal than 10% of the numeric value, unless otherwise stated. Therefore, for example, the term "about 10 mol %" includes a range from 9 mol % (inclusive) to 11 mol % (inclusive).

Stream 4 is letdown in pressure in a JT valve 52 to about 600 psig forming stream 5 that is heated in exchanger 53 to about 240° F. by lean solvent 27 to form stream 6, and flashed to a medium pressure separator 54, producing a flashed gas stream 9 and a flashed liquid stream 8. The flashed gas 9 at about 240° F. is combined with stream 31 from the LP compressor 72 forming stream 32, which is cooled by exchanger 55 and separated in separator 56 producing a flashed vapor stream 10 and a condensate stream 11. The condensate stream is letdown in pressure in JT valve 59 and combined with condensate stream 18 from the low pressure separator 63 to form combined stream 19 that is ultimately fed to stripper 64.

The flashed liquid stream 8 is letdown in pressure via JT valve 57 to about 60 to 120 psig to form stream 12, which is heated in exchanger 58 to about 240° F. to 270° F. by lean solvent 25 to form stream 13, and flashed to a low pressure separator 60, producing a flashed gas stream 15 and a flashed liquid stream 16. The flashed gas 15 at about 240° F. to 270° F. is cooled by exchanger 62 and separated in separator 63 producing a flashed vapor stream 17 and a condensate stream 18. The condensate stream 18 is combined with the medium pressure condensate to the stripper while the flashed vapor is compressed by compressor 72, forming stream 31 and combined with the flashed vapor stream 9 to be ultimately compressed by compressor 73, cooled by cooler 75, and recycled back to the feed section as recycle stream 2.

The flashed liquid stream 16 is letdown in pressure via JT valve 61 to about 40 psig forming stream 20 and fed to the upper section of stripper 64. The stripper produces an overhead stream 21 which is cooled in cooler 65 and separated in reflux drum 66, producing the acid gas 22 with a minimum 40 mol % $H_2S$ content required by the Claus unit, and water condensate stream 23 that is pumped by pump 67 as reflux to the stripper. The solvent is heated by stripper reboiler 68 producing a lean solvent 24 at about 270° F. to 310° F., and is pumped by pump 69 to about 100 psig to exchanger 58. The cooled solvent stream 26 is further pumped by pump 70 forming stream 27 that is cooled by exchanger 53 forming stream 28, which is further cooled by refrigeration to about 32° F. in exchanger 71 to form stream 29 that is recirculated to the absorber 51.

The overall mass balance for the unshifted syngas operation is shown in Table 1, and the $CO_2$ to $H_2S$ molar ratio in the feed gas, absorber bottom, medium pressure flash drum and low pressure flashed drum are shown in Table 2. For carbon capture, the CO content in the syngas can be shifted to $H_2$, resulting in a syngas with about 43 mole % $CO_2$ content, which is then treated in contemplated configurations followed by an additional $CO_2$ removal unit. In this operation, solvent requirement, regeneration duty, and the gas recycle must be increased to accommodate the high $CO_2$ content syngas. The overall mass balance for the shifted syngas operation is shown in Table 3. The $CO_2$ to $H_2S$ molar ratios are significantly higher than the unshifted case. Table 4 shows the $CO_2$ to $H_2S$ molar ratios for the feed gas, absorber bottom, medium pressure flash drum and low pressure flashed drum.

TABLE 1

| Stream | Feed Gas | Treated Gas | Acid Gas |
|---|---|---|---|
| Component Mol % | | | |
| CO2 | 19.11 | 18.75 | 34.36 |
| H2S | 1.50 | 0.000 | 61.99 |
| COS | 0.001 | 0.000 | 0.005 |
| H2 | 32.34 | 33.17 | 0.00 |
| N2 | 1.83 | 1.87 | 0.00 |
| AR | 1.14 | 1.17 | 0.00 |
| CO | 43.85 | 44.98 | 0.08 |
| CH4 | 0.04 | 0.04 | 0.00 |
| Water | 0.19 | 0.02 | 3.45 |
| Total Sulfur | | 9 ppmv | |

TABLE 2

| CO2/H2S Molar Ratio | Low | High |
|---|---|---|
| Feed Gas | 8.92 | 12.75 |
| Absorber Bottom | 1.24 | 1.77 |
| Medium Pressure Flash Liquid | 0.76 | 1.09 |
| Low pressure Flash Liquid | 0.39 | 0.55 |

TABLE 3

| Stream | Feed Gas | Treated Gas | Acid Gas | Recycle Gas |
|---|---|---|---|---|
| Component Mole % | | | | |
| CO2 | 42.539 | 2.194 | 45.355 | 99.693 |
| H2S | 0.902 | 0.000 | 51.174 | 0.000 |
| COS | 0.001 | 0.000 | 0.007 | 0.002 |
| H2 | 53.809 | 93.456 | 0.002 | 0.243 |
| N2 | 0.919 | 1.587 | 0.000 | 0.017 |
| AR | 0.733 | 1.264 | 0.000 | 0.015 |
| CO | 0.848 | 1.456 | 0.000 | 0.027 |
| CH4 | 0.020 | 0.033 | 0.000 | 0.002 |
| Water | 0.230 | 0.010 | 3.461 | — |
| Total Sulfur | | <5 ppmv | | |

TABLE 4

| CO2/H2S Molar Ratio | Low | High |
|---|---|---|
| Feed Gas | 33.03 | 47.19 |
| Absorber Bottom | 3.31 | 4.73 |
| Medium Pressure Flash Liquid | 1.69 | 2.41 |
| Low Pressure Flash Liquid | 0.62 | 0.88 |

Figure 2:
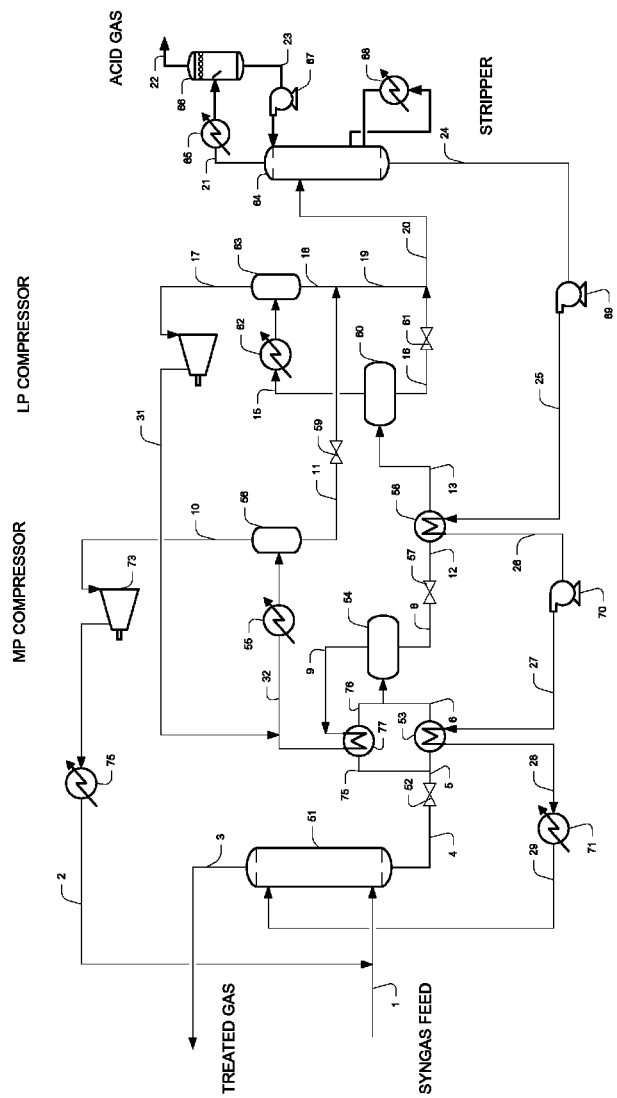
FIG. 2 is a schematic illustration of an alternative plant configuration for a plant as depicted in FIG. 1.

In yet another aspect of the inventive subject matter as depicted in FIG. 2, energy consumption is further reduced as compared to the plant configuration according to FIG. 1. More particularly, the flash vapor stream 9 from the medium pressure flash drum 54 is heat exchanged in exchanger 77 with a portion of the rich solvent stream 75 to form stream 76, thereby recovering the heat content in the flash vapor, while at the same time reducing the heating requirement by stripper reboiler 68. With respect to the remaining elements in FIG. 2, like items have like numerals, and the same considerations apply for same numerals as provided for FIG. 1 above. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Therefore, it should be noted that the nature and composition of the syngas may change considerably, and that shifted and unshifted syngas are equally contemplated herein. As a consequence, the composition and $H_2S$ to $CO_2$ ratio of suitable feed gases to the absorber will vary considerably. Most typically, however, suitable feed gases will have as predominant component(s) $H_2$, or $H_2$ and $CO_2$, and may further include CO, $CO_2$, $H_2O$, COS, and $CS_2$ in addition to $H_2S$. For example, suitable feed gases will include at least 25 mol % $H_2$, more typically at least 30 mol %, and most typically at least 40 mol %. Thus, the feed gas will typically have a molar ratio of $CO_2$ to $H_2S$ of at least 10:1, more typically at least 20:1, even more typically at least 30:1, and most typically at least 50:1 (especially where the syngas is a shifted syngas). However, contemplated configurations and methods will also be suitable for feed gases other than syngas and especially preferred alternative feed gases include those that have a pressure of at least 50 psig, more typically at least 100 psig, even more typically at least 200 psig, and most typically at least 500 psig. Such feed gases are generally characterized by a significant molar excess of $CO_2$ over $H_2S$, and it is generally contemplated that the ratio of $CO_2$ to $H_2S$ is as discussed immediately above.

In preferred aspects the solvent is a physical solvent (or a mixed solvent comprising a physical solvent) and is used in an absorber or other suitable gas/liquid contacting device. Thus, and especially where the absorber or other gas/liquid contacting device is operated at an elevated pressure (e.g., at least 50 psig, more typically at least 100 psig, even more typically at least 200 psig, and most typically at least 500 psig), $H_2S$ in the treated syngas (or other gas) can be reduced to relatively low levels. Typically, contemplated configurations and methods will allow reduction of $H_2S$ levels to equal or less than 50 ppmv, more typically equal or less than 30 ppmv, even more typically equal or less than 20 ppmv, and most typically equal or less than 10 ppmv. However, and depending on the particular source of feed gas it should be recognized that the treated gas leaving the absorber will contain appreciable quantities of $CO_2$. For example, $CO_2$ content in the treated gas may be between 0.01 mol % and 1.0 mol %, between 1.0 mol % and 10 mol %, between 10 mol % and 30 1.0 mol %, and even higher. Nevertheless, and viewed from another perspective, the treated gas will have a reduced $CO_2$ content relative to that of the feed gas (e.g., the $H_2S$- and $CO_2$-containing syngas).

As the lean solvent is preferably a lean solvent that preferentially absorbs $H_2S$ relative to $CO_2$ (e.g., MDEA or sterically hindered amine solvent), the rich solvent will typically have a $CO_2$ to $H_2S$ molar ratio of equal or less than 5.0, and more typically equal or less than 4.0 where the syngas is a shifted syngas. On the other hand, where the syngas is not shifted, the rich solvent will have a $CO_2$ to $H_2S$ molar ratio of equal or less than 2.0, and more typically equal or less than 1.5. Flashing the so obtained rich solvent will increase $H_2S$ content relative to $CO_2$, and the $CO_2$ can then be fed to front end of the plant (absorber and/or feed gas) or otherwise disposed or used.

With respect to the $H_2S$ rich acid gas stream it is generally contemplated that the $H_2S$ rich acid gas stream will have a substantial content of $H_2S$, and most typically an $H_2S$ content and composition that allows feeding of the $H_2S$ rich acid gas stream directly into a Claus reactor or other sulfur treatment plant (e.g., catalytic reduction). For example, suitable $H_2S$ rich acid gas streams will have at least 20 mol %, more typically at least 30 mol %, and most typically at least 40 mol % $H_2S$. It should also be noted that such stream will contain significant quantities of $CO_2$, which is in most cases present at a lower molar fraction than the $H_2S$ quantities. For example, the $H_2S$ rich acid gas stream will typically have an $H_2S$ to $CO_2$ ratio of at least 1.1 to 1.0, more typically at least 1.2 to 1.0, and most typically at least 1.5 to 1.0.

Flashing of the rich solvent comprising $H_2S$ is most preferably performed in several stages (although a single stage is also deemed suitable) and will result in an increased ratio of $H_2S$ to $CO_2$ in the solvent. For example, where the feed gas is shifted syngas, the flashed rich solvent may have a $CO_2$ to $H_2S$ molar ratio of equal or less than 1.0, and more typically equal or less than 0.8. On the other hand, where the feed gas is an unshifted syngas, the flashed rich solvent may have a $CO_2$ to $H_2S$ molar ratio of equal or less than 0.6, and more typically equal or less than 0.5. Consequently, it should be noted that the configurations and methods presented herein will allow for selective removal of $H_2S$ from a feed gas (and particularly a syngas) in which $CO_2$ is the predominant acid gas component over $H_2S$, and in which subsequent flashing and heating (preferably using heat from the lean solvent) is used to selectively remove $CO_2$ from the $H_2S$.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of treating an $H_2S$- and $CO_2$-containing syngas, comprising:
    absorbing in an absorber at syngas pressure $H_2S$ and $CO_2$ from the $H_2S$- and $CO_2$-containing syngas using a lean physical solvent to so form a treated $CO_2$-containing syngas and a rich solvent comprising $H_2S$ and $CO_2$, wherein the lean physical solvent is a $H_2S$ selective physical solvent;
    heating and flashing the rich solvent comprising $H_2S$ and $CO_2$ in at least two successive flash stages to produce respective flash gases enriched in $CO_2$ and respective flashed rich solvents comprising $H_2S$, wherein the step of heating the rich solvent in the at least two stages uses heat from the lean solvent;
    cooling the flash gases to form respective cooled flash gases and respective condensate streams, recycling the flash gases enriched in $CO_2$ to the syngas or absorber and feeding the condensate streams into a stripper; and
    regenerating the condensate streams and the flashed rich solvent comprising $H_2S$ in the stripper to so form the lean physical solvent and an $H_2S$ rich acid gas stream that has a $CO_2$ content of at least 30 mol % and an $H_2S$ to $CO_2$ ratio of at least 1.1:1.

2. The method of claim 1 wherein the step of absorbing is performed at a pressure of between 400 psig and 900 psig.

3. The method of claim 1 wherein the step of heating the rich solvent is performed in heat exchangers having a temperature approach of 20° F. or less.

4. The method of claim 1 wherein the step of recycling further comprises a step of compressing the flash gases enriched in $CO_2$.

5. The method of claim 1 wherein the $H_2S$- and $CO_2$-containing syngas is a shifted syngas.

6. The method of claim 1 wherein the $H_2S$- and $CO_2$-containing syngas has a molar ratio of $CO_2$ to $H_2S$ of at least 10:1.

7. The method of claim 1 wherein the treated $CO_2$-containing syngas has an $H_2S$ concentration of equal or less than 10 ppmv.

8. The method of claim 1 wherein the treated $CO_2$-containing syngas has a reduced $CO_2$ content relative to that of the $H_2S$- and $CO_2$-containing syngas.

9. The method of claim 1 wherein the $H_2S$ rich acid gas stream has an $H_2S$ content of at least 40 mol %.

10. The method of claim 1 wherein the $H_2S$ rich acid gas stream contains a higher molar fraction of $H_2S$ relative to $CO_2$.

11. The method of claim 1 wherein the flashed rich solvent comprising $H_2S$ has a $CO_2$ to $H_2S$ molar ratio of equal or less than 1.0 where the $H_2S$- and $CO_2$-containing syngas is a shifted syngas.

12. The method of claim 1 wherein the flashed rich solvent comprising H2S has a CO2 to H2S molar ratio of equal or less than 0.6 where the H2S- and CO2-containing syngas is an unshifted syngas.

13. The method of claim 1 wherein the rich solvent comprising H2S has a CO2 to H2S molar ratio of equal or less than 5.0 where the H2S- and CO2-containing syngas is a shifted syngas.

14. The method of claim 1 wherein the rich solvent comprising H2S has a CO2 to H2S molar ratio of equal or less than 2.0 where the H2S- and CO2-containing syngas is an unshifted syngas.

* * * * *